(12) United States Patent
Kumagai et al.

(10) Patent No.: US 7,385,685 B2
(45) Date of Patent: Jun. 10, 2008

(54) POSITION DETECTING DEVICE AND INCLINATION SENSOR DEVICE OF SURVEYING APPARATUS USING THE SAME

(75) Inventors: Kaoru Kumagai, Tokyo (JP); Shinji Yamaguchi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 11/541,675

(22) Filed: Oct. 3, 2006

(65) Prior Publication Data

US 2007/0081146 A1    Apr. 12, 2007

(30) Foreign Application Priority Data

Oct. 7, 2005    (JP) ............................. 2005-294594
Sep. 26, 2006   (JP) ............................. 2006-259923

(51) Int. Cl.
    *G01B 11/26* (2006.01)
(52) U.S. Cl. ................................... 356/139.1
(58) Field of Classification Search ............. 356/139.1
    See application file for complete search history.

(56) References Cited

U.S. PATENT DOCUMENTS 5,893,215 A * 4/1999 Kumagai et al. ........ 33/366.16

FOREIGN PATENT DOCUMENTS

JP          2000-105119 A      4/2000

* cited by examiner

*Primary Examiner*—Thomas H. Tarcza
*Assistant Examiner*—Luke D Ratcliffe
(74) *Attorney, Agent, or Firm*—Foley & Lardner LLP

(57) ABSTRACT

A position detecting device includes: a liquid having a free surface; a light source configured to irradiate a light flux toward the free surface of the liquid; a dark field pattern provided between the liquid and the light source and configured to form a pattern of the light flux irradiated by the light source; a light-receiving sensor configured to detect the pattern of the light flux reflected by the free surface of the liquid; and an arithmetic unit configured to calculate a position of the pattern from results of detection of the light-receiving sensor, add the results of the detection of the light-receiving sensor in an X-direction and a Y-direction of the light-receiving sensor, and calculate the position of the pattern from an output obtained by adding the results of the detection in the X-direction and the Y-direction.

21 Claims, 5 Drawing Sheets

POSITION DETECTING DEVICE AND INCLINATION SENSOR DEVICE OF SURVEYING APPARATUS USING THE SAME

BACKGROUND

The present invention relates to a position detecting device which utilizes a liquid having a free surface. More particularly, the invention relates to a position detecting device suitable for an inclination sensor device of a surveying apparatus and which has a compact structure, and to the inclination sensor device of the surveying apparatus using the position detecting device.

JP2000-105119A discloses a position detecting device and a surveying apparatus using the position detecting device, which includes: an emission optical system; a dark field pattern; a liquid; a projection optical system; a first light-condensing element; a second light-condensing element; a first light-receiving sensor; and a second light receiving sensor.

According to the position detecting device and the surveying apparatus of JP2000-105119A, the emission optical system emits a light flux from a light source in parallel, and the dark field pattern includes transit portions, through which the pattern forming light flux from the emission optical system is passed, and arranges the transit portions two-dimensionally in a pattern therein. The liquid, having a free surface, reflects the pattern forming light flux, and the projection optical system projects the pattern forming light flux reflected by the free surface of the liquid. The first light-condensing element structures a part of the projection optical system and condenses the pattern forming light flux in a first direction, and the second light-condensing element also structures a part of the projection optical system and condenses the pattern forming light flux in a second direction which is different from the first direction. The first light-receiving sensor receives projection images of the dark field pattern formed by the pattern forming light flux condensed by the first light-condensing element, and the second light-receiving sensor receives the projection images of the dark field pattern formed by the pattern forming light flux condensed by the second light-condensing element.

Thereby, the position detecting device and the surveying apparatus of JP2000-105119A detects positions of the projection images of an X-direction and positions of the projection images of a Y-direction based on a light-receiving signal of the first light-receiving sensor and a light-receiving signal of the second light-receiving sensor, so as to obtain movement amounts of the projection images from a reference position. The position detecting device and the surveying apparatus of JP2000-105119A also converts the obtained movement amounts of the projection images to an angle of inclination.

The JP2000-105119A further discloses an inclination sensor device of the surveying apparatus utilizing such a position detecting device.

According to the position detecting device and the inclination sensor device of the surveying apparatus utilizing the same of the JP2000-105119A, however, because the pattern forming light flux, reflected from the free surface of the liquid, is made to condense in the directions different from each other by utilizing the first light-condensing element and a cylindrical lens as the second light-condensing element each structuring the part of the projection optical system, and then the condensed light fluxes are received by the first light-receiving sensor and the second light-receiving sensor, respectively, there are problems that the structure of the projection optical system is complicated, and the position detecting device and the inclination sensor device are difficult to achieve compactification.

SUMMARY

At least one objective of the present invention is to provide a position detecting device capable of achieving compactification of an optical structure of a projection optical system, and an inclination sensor device of a surveying apparatus using the position detecting device.

To achieve these and other advantages and in accordance with the purpose of the invention, as embodied and broadly described herein, the invention provides a position detecting device, comprising: a liquid having a free surface; a light source configured to irradiate a light flux toward the free surface of the liquid; a dark field pattern provided between the liquid and the light source and configured to form a pattern of the light flux irradiated by the light source; a light-receiving sensor configured to detect the pattern of the light flux reflected by the free surface of the liquid; and an arithmetic unit configured to calculate a position of the pattern from results of detection of the light-receiving sensor, add the results of the detection of the light-receiving sensor in an X-direction and a Y-direction of the light-receiving sensor, and calculate the position of the pattern from an output obtained by adding the results of the detection in the X-direction and the Y-direction.

In accordance with an embodiment of the invention, the pattern is so disposed that widths thereof become different in the X-direction and the Y-direction, and the arithmetic unit is configured to calculate the position of the pattern relative to a reference position from the output obtained by adding the results of the detection in the X-direction and the Y-direction.

In accordance with an embodiment of the invention, the pattern is so disposed that widths thereof become different periodically in the X-direction and the Y-direction, and the arithmetic unit is configured to perform a Fourier transformation of the output obtained by adding the results of the detection in the X-direction and the Y-direction, and calculate the position of the pattern relative to a reference position by utilizing a phase difference.

In accordance with an embodiment of the invention, the pattern includes a plurality of patterns each having the width periodically different from each other in the X-direction and the Y-direction and disposed alternately.

In accordance with an embodiment of the invention, the position detecting device further comprises: a half mirror configured to reflect and deflect the light flux reflected by the free surface of the liquid; a quarter wavelength plate provided in an optical path between the liquid and the half mirror; and a polarizing plate provided in an optical path between the half mirror and the dark field pattern.

In accordance with an embodiment of the invention, the position detecting device further comprises a polarizing mirror provided between the dark field pattern and the liquid and configured to reflect and deflect the light flux reflected by the free surface of the liquid.

In accordance with an embodiment of the invention, the light-receiving sensor includes a plurality of light-receiving elements, a vertical resister and a horizontal resister, and the arithmetic unit is configured to subsequently store results of the detection of the pattern of the light flux of the respective light-receiving elements outputted from the respective light-receiving elements through the vertical resister and the horizontal resister, add the stored results of the detection of the respective light-receiving elements in the X-direction and the Y-direction of the light-receiving sensor, and calculate the position of the pattern from an output obtained by adding the results of the detection of the stored results of the detection of the respective light-receiving element in the X-direction and the Y-direction.

In accordance with an embodiment of the invention, the light-receiving sensor includes light-receiving elements arranged in a matrix-like configuration in the X-direction and the Y-direction, the light-receiving sensor is configured to add signals from the light-receiving elements aligned in the X-direction and the Y-direction and output the added signals, and the arithmetic unit is configured to calculate the position of the pattern from the added signals added in the in the X-direction and the Y-direction and outputted.

In accordance with an embodiment of the invention, the arithmetic unit is configured to convert the position of the pattern to an angle of inclination based on the calculated position of the pattern.

In addition, the present invention provides another position detecting device, comprising: an optical system including a light source configured to emit a light flux irradiated by the light source in parallel; a dark field pattern including transit portions through which the light flux from the light source is passed, wherein the transit portions are aligned two-dimensionally in an X-direction and a Y-direction; a liquid having a free surface configured to reflect the light flux as a pattern forming light flux which has passed through the transit portions of the dark field pattern; a half mirror provided between the liquid and the dark field pattern and configured to reflect the pattern forming light flux reflected by the free surface of the liquid; a projector lens configured to project the pattern forming light flux reflected by the half mirror as a projection image; a light-receiving sensor configured to receive the projection image projected by the projector lens and including light-receiving elements aligned in a matrix configuration in the X-direction and the Y-direction; and an arithmetic unit configured to calculate a position of the projection image projected on the light-receiving sensor based on reading outputs of the projection image outputted from the light-receiving sensor, add results of detection of the light-receiving elements aligned in the X-direction in the X-direction and output a reading output of the Y-direction, and add results of detection of the light-receiving elements aligned in the Y-direction in the Y-direction and output a reading output of the X-direction.

In accordance with an embodiment of the invention, the light-receiving sensor further includes a vertical resister and a horizontal resister, and the arithmetic unit is configured to subsequently store the results of the detection of the respective light-receiving elements outputted from the respective light-receiving elements through the vertical resister and the horizontal resister, add the stored results of the detection of the respective light-receiving elements in the X-direction and the Y-direction of the light-receiving sensor, and calculate the position of the pattern from the reading outputs obtained by adding the results of the detection of the stored results of the detection of the respective light-receiving element in the X-direction and the Y-direction.

Also, the present invention provides an inclination sensor device of a surveying apparatus, comprising a position detecting device including: a liquid having a free surface; a light source configured to irradiate a light flux toward the free surface of the liquid; a dark field pattern provided between the liquid and the light source and configured to form a pattern of the light flux irradiated by the light source; a light-receiving sensor configured to detect the pattern of the light flux reflected by the free surface of the liquid; and an arithmetic unit configured to calculate a position of the pattern from results of detection of the light-receiving sensor, add the results of the detection of the light-receiving sensor in an X-direction and a Y-direction of the light-receiving sensor, and calculate the position of the pattern from an output obtained by adding the results of the detection in the X-direction and the Y-direction.

Therefore, according to the present invention, it is possible to accomplish an advantages effect of achieving the compactification of the optical structure of the projection optical system.

In addition, since it is possible to reduce the number of optical elements structuring the projection optical system, reduction of error factors is possible.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A and 1B each illustrate an optical system of a position detecting device according to an embodiment of the invention, wherein FIG. 1A illustrates an detailed optical diagram, and FIG. 1B partially and schematically illustrates the optical system.

DESCRIPTION OF THE PREFERRED EMBODIMENTS

Figure 1A:
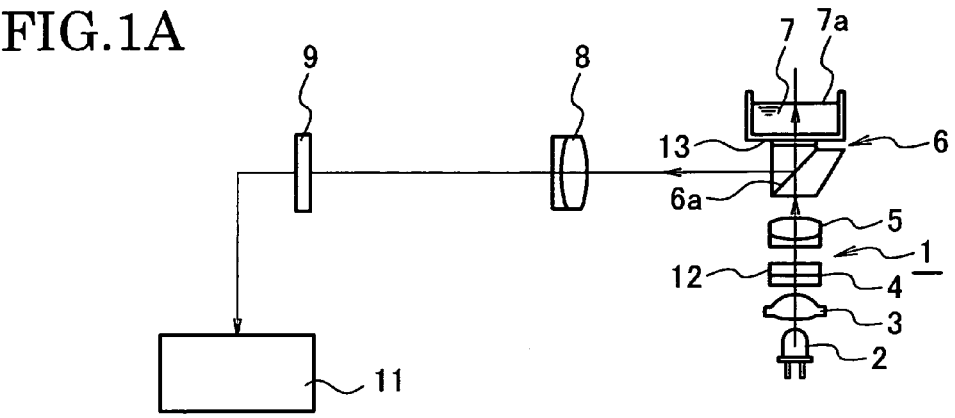

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 1B:
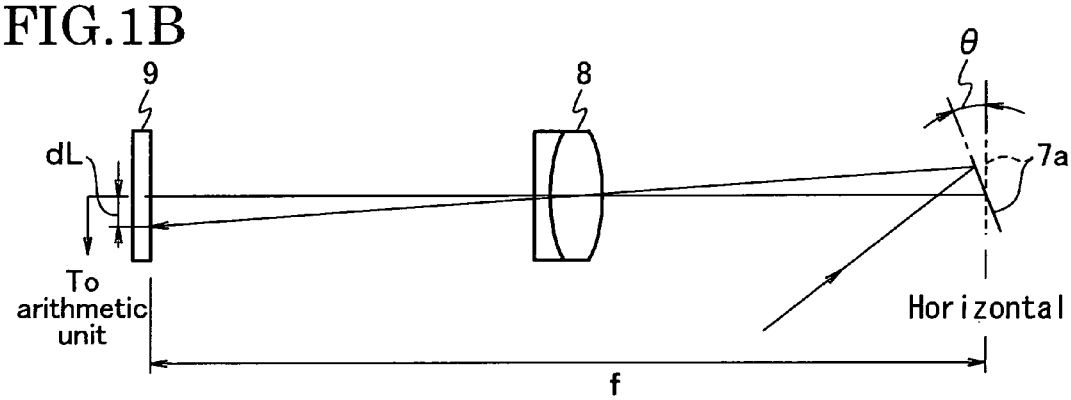

FIGS. 1A and 1B each illustrate an optical structure of an inclination sensor device 1 structuring a main part of a position detecting device according to a preferred embodiment of the invention. The inclination sensor device 1 according to the preferred embodiment includes a light source 2, a condenser lens 3, a dark field pattern 4, a relay lens 5, a half mirror 6, a liquid 7 having a free surface 7a, a projector lens 8, and a light-receiving sensor 9.

In the preferred embodiment, a light-emitting diode (LED) is used for the light source 2, although any other kinds of suitable light sources may be used instead of the LED.

The condenser lens 3 functions as an emission optical system which emits a light flux from the light source 2 in parallel.

In the preferred embodiment, a polarizing plate 12 is provided between the dark field pattern 4 and the relay lens 5. In addition, a quarter wavelength plate (λ/4 plate) 13 is disposed between the half mirror 6 and the liquid 7.

In an alternative embodiment of the invention, the polarizing plate 12 and the quarter wavelength plate 13 are eliminated, and a polarizing mirror is arranged instead of the half mirror 6.

Figure 2:
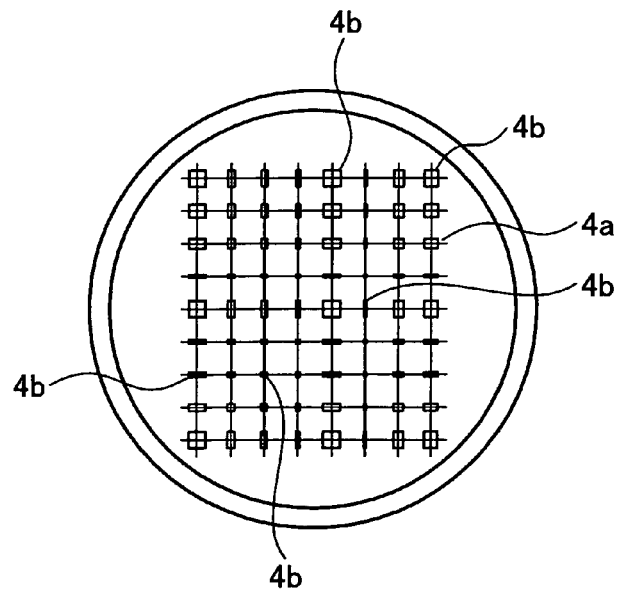
FIG. 2 illustrates one example of a dark field pattern according to an embodiment of the invention.

The dark field pattern 4 is used to form projection images of patterns thereof on the light-receiving sensor 9, which will be described later. As illustrated in FIG. 2, the dark field pattern 4 has a configuration in which a plurality of transit portions or slits 4b is arranged and aligned in a black mask portion 4a.

Figure 3:
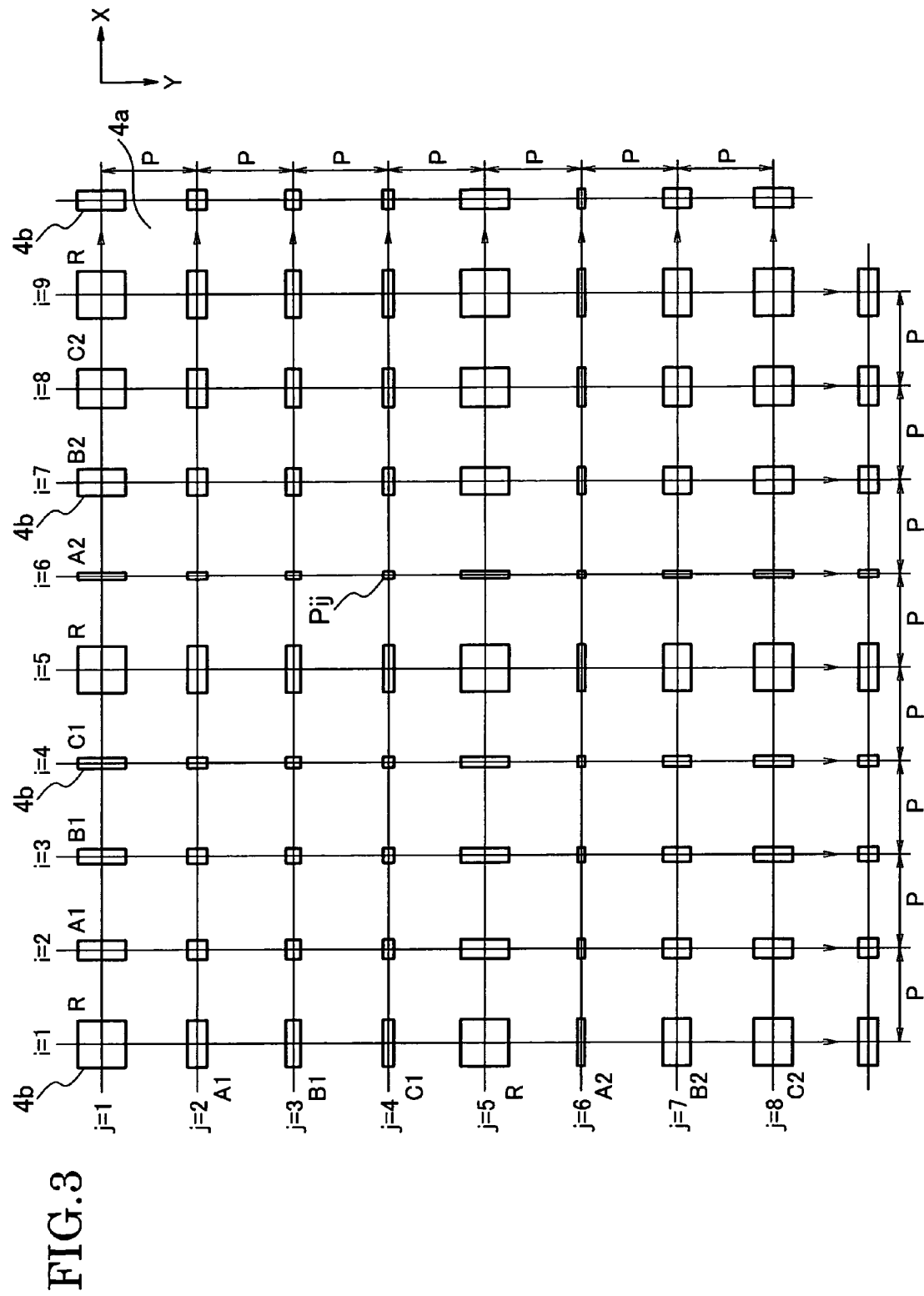
FIG. 3 is an enlarged view illustrating the dark field pattern illustrated in FIG. 2.

FIG. 3 is an enlarged view of the dark field pattern 4. The transit portions 4b form an absolute pattern including arrangement patterns of the transit portions 4b in an X-axis direction and arrangement patterns of the transit portions 4b in a Y-axis direction which are in perpendicular to each other.

As illustrated in FIG. 3, each column of the patterns in the X-axis direction is represented by a reference sign "i" (i is an integer from 1 to N), whereas each row of the patterns in the Y-axis direction is represented by a reference sign "j" (j is an integer from 1 to K). In addition, a particular pattern is represented by a reference sign "Pij". Here, FIG. 3 according to the preferred embodiment illustrates one example of a case wherein N=9 and K=8, although it is not limited thereto.

Referring to FIG. 3, in row patterns of a first row, a reference pattern R, a first pattern A, a second pattern B and a third pattern C are repeatedly arranged at even intervals (P). In other words, the four types of patterns of the reference pattern R, the first pattern A, the second pattern B and the third pattern C are defined as a set to structure a block, and the plural blocks are continuously formed. In the preferred embodiment, hence, when the patterns of R, A(1), B(1) and C(1) are established in the block disposed leftmost of the dark field pattern 4 illustrated in FIG. 3, the patterns in the first row are repeatedly arranged in an order of R, A(1), B(1), C(1); R, A(2), B(2), C(2); R, A(3), B(3), C(3) and so on as the respective blocks for example.

Therefore, in FIG. 3 according to the preferred embodiment, P11=R, P21=A1, P31=B1, P41=C1, P51=R, P61=A2, P71=B2, P81=C2, and P91=R are obtained.

Similarly, in column patterns of a first column, the reference pattern R, the first pattern A, the second pattern B and the third pattern C are repeatedly arranged at the even intervals (P). In other words, similar to the pattern of the first row, the four types of patterns of the reference pattern R, the first pattern A, the second pattern B and the third pattern C are defined as a set to structure a block, and the plural blocks are continuously formed. In the preferred embodiment, hence, when the patterns of R, A(1), B(1) and C(1) are established in the block disposed uppermost of the dark field pattern 4 illustrated in FIG. 3, the patterns in the first column are repeatedly arranged in an order of R, A(1), B(1), C(1); R, A(2), B(2), C(2); R, A(3), B(3), C(3) and so on as the respective blocks for example.

Therefore, in FIG. 3 according to the preferred embodiment, P11=R. P12=A1, P13=B2, P14=C1, P15=R, P16=A2, P17=B2, and P18=C2 are obtained.

Turning to FIG. 1, the relay lens 5 functions to transmit therethrough a pattern forming light flux which has passed through the dark field pattern 4, and to guide the pattern forming light flux toward the liquid 7.

In the preferred embodiment, the half mirror 6 is structured by a beam splitter having a semi-transmissive surface 6a. The pattern forming light flux, which has entered the half mirror 6, transits the semi-transmissive surface 6a, and is guided upward as illustrated in FIG. 1. The guided pattern forming light flux then enters the liquid 7, and goes toward the free surface 7a. Thereafter, the pattern forming light flux is reflected by the free surface 7a, and the reflected pattern forming light flux then returns to the half mirror 6. The returned pattern forming light flux is then reflected by the semi-transmissive surface 6a of the half mirror 6, such that the pattern forming light flux is guided toward the projector lens 8.

The liquid 7 includes a liquid body having moderate viscosity, such as a silicon oil or the like although it is not limited thereto. Since the liquid 7 has the free surface 7a, the free surface 7a maintains its horizontality relative to inclination of the inclination sensor device 1.

The projector lens 8 functions to image the pattern forming light flux, reflected by the free surface 7a and guided by the semi-transmissive surface 6a, onto the light-receiving sensor 9. In the preferred embodiment, a two-dimensional area sensor 9 capable of outputting detection outputs, in which results of detection for the projection images 4' of the patterns of the dark field pattern 4 are added in an X-direction and a Y-direction illustrated in FIG. 4 of the area sensor 9, is used for the light-receiving sensor 9.

Figure 4:
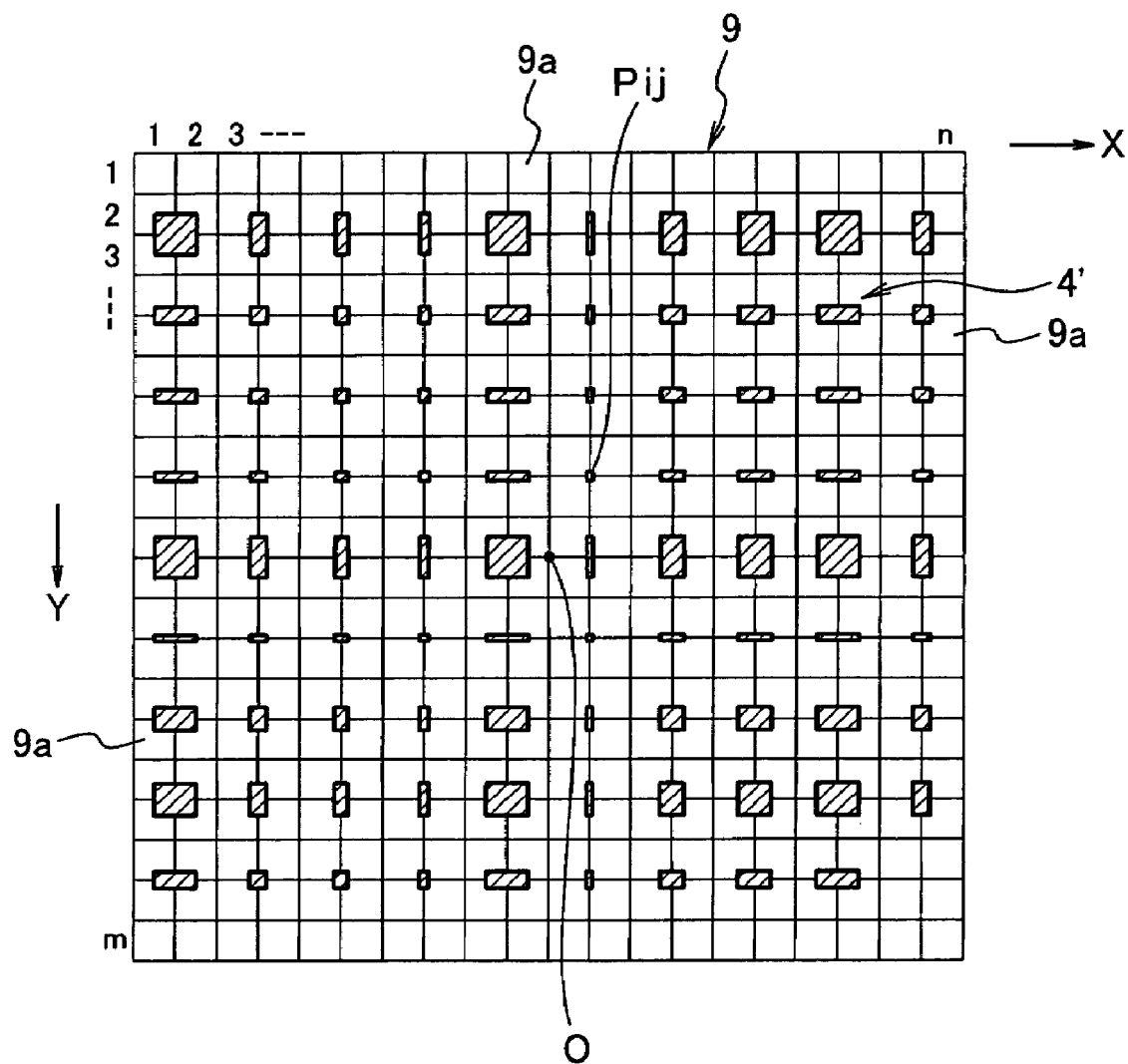
FIG. 4 illustrates an area sensor on which the dark field pattern is projected.

The area sensor 9 according to the preferred embodiment includes light-receiving elements 9a aligned in a matrix-like configuration, in which n-number of the light-receiving elements 9a are aligned in the X-direction and m-number of the light-receiving elements 9a are aligned in the Y-direction. As illustrated in FIG. 4, the projection images 4' as pattern images of the dark field pattern 4 are projected onto the light-receiving elements 9a of the area sensor 9.

Here, (i, j) represents an output of the light-receiving element 9a located i, j-th. In addition, (1, 1) represents an output of the light-receiving element 9a in an upper left corner of the area sensor 9 illustrated in FIG. 4, and (m, n) represents an output of the light-receiving element 9a in a lower right corner of the area sensor 9 illustrated in FIG. 4.

In the preferred embodiment, reading outputs of the data in the X-direction of the area sensor 9 may be represented by formulae as described below and illustrated in FIG. 5.

$$X1=(1,1)+(2,1)+(3,1)+\ldots+(m,1) \tag{A1}$$

$$X2=(1,2)+(2,2)+(3,2)+\ldots+(m,2) \tag{A2}$$

$$X3=(1,3)+(2,3)+(3,3)+\ldots+(m,3) \tag{A3}$$

$$\ldots$$

$$Xn=(1,m)+(2,m)+(3,m)+\ldots+(m,n) \tag{An}$$

Similarly, reading outputs of the data in the Y-direction of the area sensor 9 may be represented by formulae as described below and illustrated in FIG. 5.

$$Y1=(1,1)+(1,2)+(1,3)+\ldots+(1,n) \tag{B1}$$

$$Y2=(2,1)+(2,2)+(2,3)+\ldots+(2,n) \tag{B2}$$

$$Y3=(3,1)+(3,2)+(3,3)+\ldots+(3,n) \tag{B3}$$

$$\ldots$$

$$Ym=(m,1)+(m,2)+(m,3)+\ldots+(m,n) \tag{Bm}$$

Figure 5:
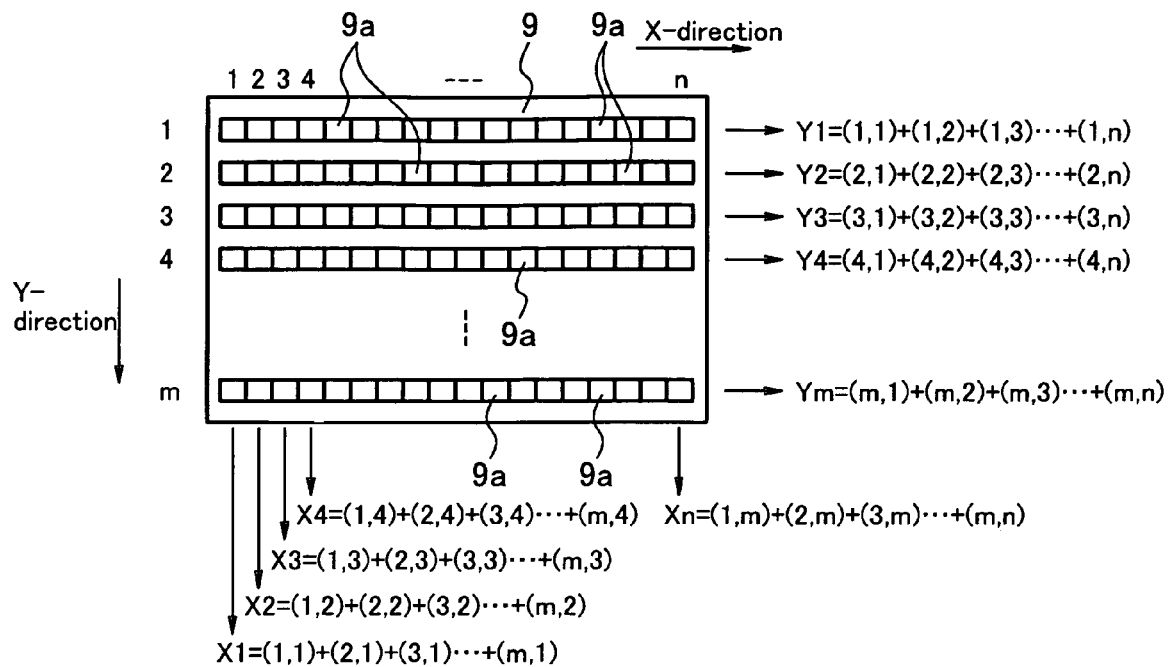
FIG. 5 is a view explaining outputting of reading outputs of the area sensor illustrated in FIG. 4.

The reading outputs of the data with respect to the X-direction of the area sensor 9 as illustrated in a lower side of FIG. 5 and the reading outputs of the data with respect to the Y-direction of the area sensor 9 as illustrated in a right side of FIG. 5 are equivalent to the projection images 4', which are condensed in the X-direction with the intervals of the pitches P and which represent positions of the patterns in the Y-direction, and equivalent to the projection images 4', which are condensed in the Y-direction with the intervals of the pitches P and which represents positions of the patterns in the X-direction, respectively.

More specifically, this is because the reading outputs of the data in the X-direction of the area sensor 9 are equivalent to photo-electric conversional outputs based on the projection images of the absolute pattern which are projected on a line sensor extending in the Y-direction by utilizing a cylindrical lens, which condenses the projection images 4' of the dark field pattern 4 distributed at the intervals of the pitches P, in the X-direction and which projects the condensed projection images 4' on the line sensor extending in the Y-direction.

In addition, this is because the reading outputs of the data in the Y-direction of the area sensor 9 are equivalent to photo-electric conversional outputs based on the projection images of the absolute pattern which are projected on a line sensor extending in the X-direction by utilizing a cylindrical lens, which condenses the projection images 4' of the dark field pattern 4 distributed at the intervals of the pitches P, in the Y-direction and which projects the condensed projection images 4' on the line sensor extending in the X-direction. Meanwhile, the structure of such a projection optical system utilizing the cylindrical lenses is disclosed in the above-described JP2000-105119A.

Therefore, the area sensor 9 according to the preferred embodiment has an X-direction projection data outputting function configured to add each of the light-receiving elements, aligned in the X-direction, in the X-direction and output the reading outputs in the Y-direction, and a Y-direction projection data outputting function configured to add each of the light-receiving elements, aligned in the Y-direction, in the Y-direction and output the reading outputs in the X-direction.

The reading outputs of the area sensor 9 are inputted into an arithmetic unit 11 illustrated in FIG. 1A. The arithmetic unit 11 includes a central processing unit (CPU). The arithmetic unit 11 controls the entire parts of the device, and is configured to detect a position of each of the projection images 4' of the dark field pattern 4 on the area sensor 9. Moreover, for example, the arithmetic unit 11 is configured to obtain, by defining the positions of the projection images 4' at the time when the image of the particular pattern Pij is located on a center O (for example, see FIG. 4) of the area sensor 9 as a reference position, a difference between the reference position and the positions of projection images 4' actually projected on the area sensor 9. Thereby, the corresponding angle of inclination is obtained.

Because the horizontality of the free surface 7a of the liquid 7 is kept even when the inclination sensor device 1 is inclined, each of the projection images 4' on the area sensor 9 moves in proportion to the angle of inclination.

The more the inclination sensor device 1 is inclined by an angle θ, the more the pattern forming light flux reflected by the free surface 7a inclines by 2nθ, wherein "n" is a refractive index of the liquid 7. In addition, when a focal length of the projector lens 8 is "f" as illustrated in FIG. 1B, (in the preferred embodiment, the focal length is equal to a distance on the optical axis from the free surface 7a of the liquid 7 to the area sensor 9) and an amount of misalignment of the particular pattern Pij from the center O of the area sensor 9 is "dL", the following formula is established:

$$dL = f \times \tan(2n\theta) \tag{1}$$

Therefore, when the positions of the projection images 4' in the X-direction and the Y-directions of the dark field pattern 4 are detected with the area sensor 9, the amount of misalignment dL from the reference position is obtained and the obtained amount of misalignment dL is converted to the corresponding angle of inclination θ by the arithmetic unit 11, it is possible to measure the inclination of the inclination sensor device 1.

Hereinafter, detailed arithmetic processing for the angle of inclination carried out by the arithmetic unit 11 will be described.

As already disclosed above, in the preferred embodiment, the angle of inclination θ is obtained by defining the particular pattern Pij as the reference position, and the amount of misalignment dL of the positions of the projection image 4' on the area sensor 9 detected thereby relative to the reference position is measured.

With respect to the amount of misalignment which is, for example, equal to or less than the interval of the pitch P, spatial frequencies corresponding to the pattern images of the pitches P are subjected to a Fourier transformation to obtain a sine wave or a cosine wave, which is to be used as a reference signal.

In the preferred embodiment, a phase difference of a signal when the inclination sensor device 1 is placed horizontal (i.e. the angle θ=0), or more specifically, the phase difference of the signal obtained by the Fourier transformation of the reading outputs Xi and Yj of the area sensor 9, obtained when the particular pattern Pij is in conformity to the center O of the area sensor 9, relative to a phase of the reference signal is "0".

In addition, when the inclination sensor device 1 is inclined by the angle θ, the particular pattern Pij is misaligned or deviated from the center O of the area sensor 9. Thus, a phase of the signal obtained by the Fourier transformation of the reading outputs Xi and Yj of the area sensor 9 is shifted relative to the phase of the reference signal.

Therefore, the amount of misalignment equal to or less than the interval of the pitch P may be obtained by the following formula, by defining a difference of the phase of the signal relative to the phase of the reference signal, i.e. the phase difference, as Φ:

$$\Phi \times P \times m / (2\pi) \tag{2}$$

wherein, a reference sign "m" represents magnification.
Thereby, it is possible to measure the amount of misalignment equal to or less than the interval of the pitch P with high precision.

Here, in the preferred embodiment, the magnification "m" is a ratio of a distance from the light source 2 to the free surface 7a of the liquid 7 to a distance from the free surface 7a to the area sensor 9.

The amount of misalignment dL of the particular pattern Pij from the center O of the area sensor 9 may be obtained by addition of the amount of misalignment in a unit of the pitch and the amount of misalignment equal to or less than the interval of the pitch P, which will be described later.

Therefore, the arithmetic unit 11 is possible to compute the corresponding angle of inclination based on the entire amount of misalignment dL. In other words, since it is possible to obtain the reading outputs Xi of the data with respect to the X-direction and the reading outputs Yj of the data with respect to the Y-direction with the area sensor 9, it is possible to obtain the angle of inclination in the X-axis direction and the Y-axis direction by the arithmetic unit 11 according to the each of the reading outputs in the X-direction and the Y-direction.

Figure 6:
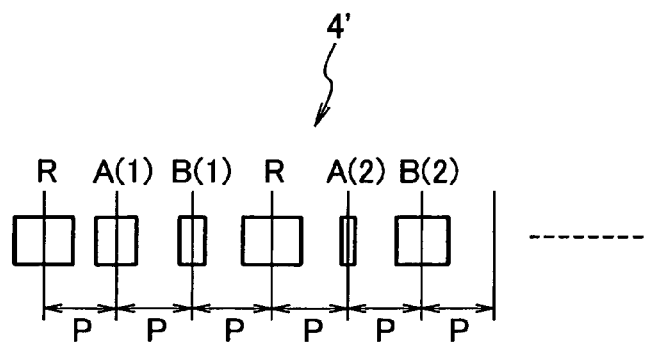
FIG. 6 is a view explaining a principle of measurement of the position detecting device according to an embodiment of the invention.

Now, calculation of the amount of misalignment in the unit of the pitch will be described. Note that the projection images 4' formed by the light-receiving elements 9a here include successive arrangements of R, A(0), B(0), R, A(1), B(1), R, A(2), B(2) and so on as the respective blocks, and the patterns C are omitted, as illustrated in FIG. 6, for the sake of simplifying the explanation.

The dark field pattern 4 here has a configuration in which each block, including three types of patterns of the reference pattern R, the first pattern A and the second pattern B as a set, is continuously formed, and in which all of the patterns are repeatedly arranged at the even intervals P. Because all of the patterns are repeated at the even intervals P, the signal corresponding to the intervals P is set as the reference signal.

In the preferred embodiment of the invention, each of the reference pattern R has a fixed width of 50 μm, and the width of which is preferably black. In each of the first pattern A, a width of a black part thereof is modulated so that one period is established by the seven blocks. Also, in each of the second pattern B, a width of a black part thereof is modulated so that one period is established by the five blocks.

Since the width of the black part of each of the first pattern A is modulated such that the 7 blocks become the one period, a first pattern width DA is given by the following formula when the modulation widths are set from 20 μm to 80 μm:

$$DA = 50 + 30 \times \text{SIN}(2 \times \pi \times X/7) \quad (3)$$

where X is an integer, and X=(0, 1, 2, 3, 4, 5, 6 or 7)

Similarly, since the width of the black part of each of the second pattern B is modulated such that the 5 block become the one period, a second pattern width DB is given by the following formula:

$$DB = 50 + 30 \times \text{SIN}(2 \times \pi \times X/5) \quad (4)$$

where X is an integer, and X=(0, 1, 2, 3, 4 or 5)

Thus, since the periods of the first patterns A and the second patterns B are slightly different from each other, a pattern same as the initial pattern appears in a least common multiple between the periods of the first patterns A and the second patterns B. According to the preferred embodiment of the invention, the pattern same as the initial pattern appears in the 35th block as the least common multiple of the 7 blocks and the 5 blocks.

More specifically, when a phase number of the first pattern A is defined as ΦA (from 1 to 7) and a phase number of the second pattern B is defined as ΦB (from 1 to 5), the amount of misalignment H from the center O of the area sensor 9 in the unit of the pitch P of the projection images 4' of the dark field pattern 4 is obtained by the following formula:

$$H = \Phi AB \times P \times m \quad (5)$$

wherein a block number according to a combination of the ΦA and the ΦB is ΦAB. Therefore, the amount of misalignment dL is:

$$dL = H + \Phi \times P \times m/(2\pi)$$

The arithmetic unit 11 has an amplifier which is not illustrated. The reading outputs (A1-An, B1-Bm) amplified by the amplifier are digitally converted, and the digitalized reading outputs are inputted into an arithmetic section which is not illustrated.

The arithmetic section works out the block number in which the reference position is included from the phase numbers of a signal according to the first pattern A and a signal according to the second pattern B. Furthermore, the arithmetic section obtains the amount of misalignment in the unit of the pitch, matches digits with the amount of misalignment based on the phase (the above second formula) equal to or less than the interval of the pitch P obtained by the Fourier transformation (or fast Fourier transformation), so as to obtain the amount of misalignment dL of the dark field pattern 4.

Then, the angle of inclination calculated by the arithmetic section may be displayed on a display which is not illustrated.

In addition, when the above-described inclination sensor device 1 according to the preferred embodiment of the invention is attached to an electronic type theodolite for example, it is possible to detect the inclination of a body of a surveying apparatus in the X-direction and the Y-direction.

In the present preferred embodiment of the invention, the two-dimensional area sensor 9 capable of outputting the detection outputs in which the results of detection of the projection images 4' are added in the X-direction and the Y-direction. According to an alternative embodiment illustrated in FIG. 7, the position detecting device and the inclination sensor device of the surveying apparatus according to the present invention may utilize an image sensor 14 as the light-receiving sensor.

Figure 7:
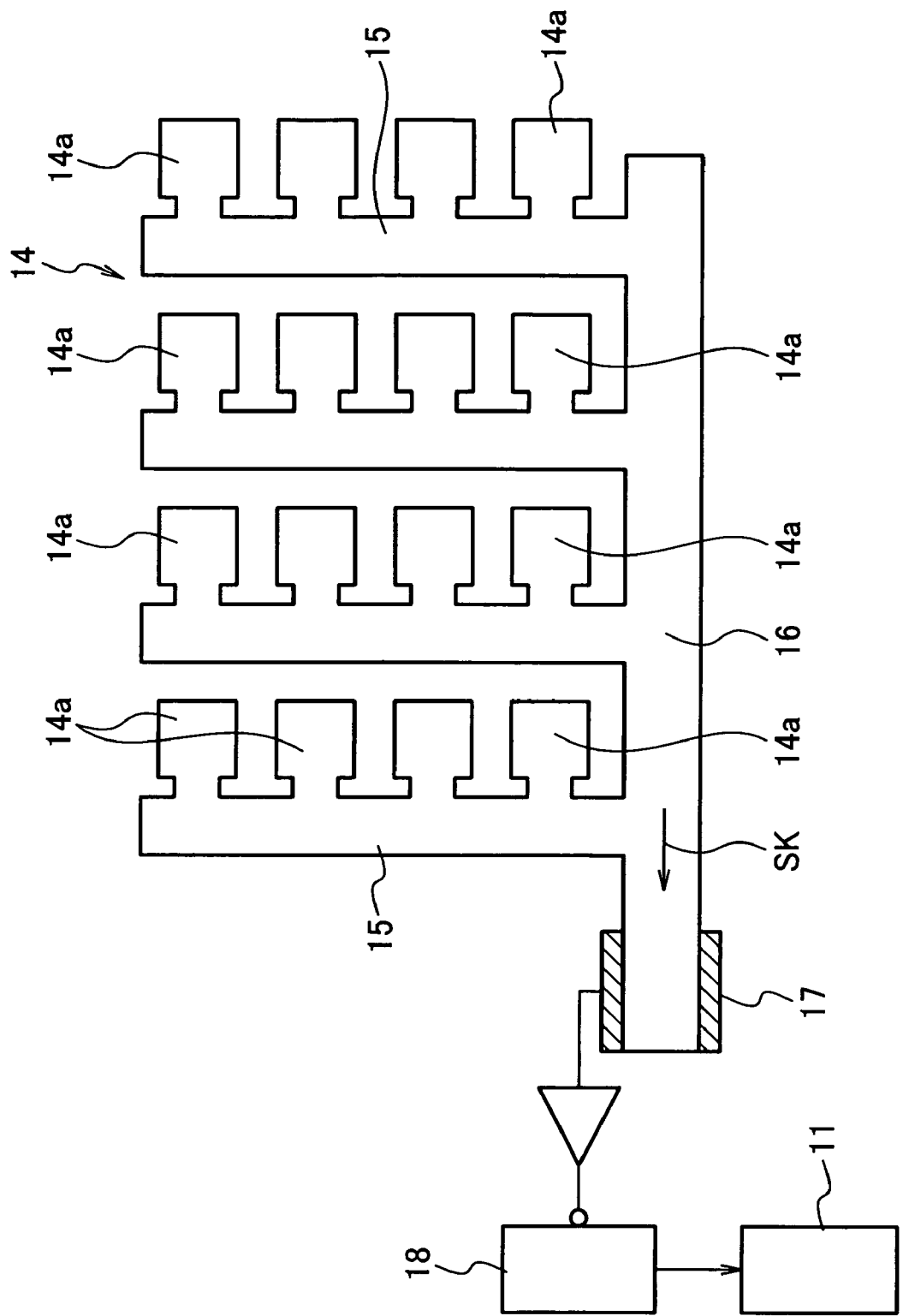
FIG. 7 is a circuit diagram illustrating a case in which an image sensor is used instead of the area sensor.

Referring to FIG. 7, in the alternative embodiment, detection signals SK as electrical charges accumulated in respective light receiving elements 14a of the image sensor 14 are subsequently transferred through vertical registers 15 to a horizontal register 16, and the detection signals SK are subsequently transferred from the horizontal register 16 to an output section 17. Then, each of the detection signals SK outputted from the respective light-receiving elements 14a are subsequently stored into a storage section 18 in accordance with arrangement of the light-receiving elements 14a.

The arithmetic unit 11 then calculates the positions of the patterns from the arrangement of the patterns obtained by adding the detection signals SK, stored in the storage section 18, in the X-direction and the Y-direction of the image sensor 14.

According to the present embodiment, it is possible to attain compactification of the optical structure of a projection optical system with the use of the image sensor, while achieving functions similar to those of the conventional combination of the cylindrical lenses and the line sensors.

The present application is based on and claims priority from Japanese Patent Application Serial No. 2005-294594, filed Oct. 7, 2005 and Japanese Patent Application Serial No. 2006-259923, filed Sep. 26, 2006, the disclosures of those are hereby incorporated by reference herein in their entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A position detecting device, comprising:
   a liquid having a free surface;
   a light source configured to irradiate a light flux toward the free surface of the liquid;
   a dark field pattern provided between the liquid and the light source and including patterns having widths different from each other in both an X-direction and a Y-direction, and configured to form the patterns of the light flux irradiated by the light source;
   a light-receiving sensor configured to detect the patterns of the light flux reflected by the free surface of the liquid; and
   an arithmetic unit configured to calculate positions of the patterns from results of detection of the light-receiving sensor, add the results of the detection of the light-receiving sensor in the X-direction and the Y-direction of the light-receiving sensor, and calculate the positions of the patterns from an output obtained by adding the results of the detection in the X-direction and the Y-direction.

2. The position detecting device according to claim 1, wherein the arithmetic unit is configured to calculate the positions of the patterns relative to reference positions from the output obtained by adding the results of the detection in the X-direction and the Y-direction.

3. The position detecting device according to claim 1, wherein the patterns are so disposed that widths thereof become different periodically in the X-direction and the Y-direction, and
   wherein the arithmetic unit is configured to perform a Fourier transformation of the output obtained by adding the results of the detection in the X-direction and the Y-direction, and calculate the positions of the patterns relative to reference positions by utilizing a phase difference.

4. The position detecting device according to claim 3, wherein each of the patterns has the width periodically different from each other in the X-direction and the Y-direction and disposed alternately.

5. The position detecting device according to claim 1, further comprising:
   a half mirror configured to reflect and deflect the light flux reflected by the free surface of the liquid;
   a quarter wavelength plate provided in an optical path between the liquid and the half mirror; and
   a polarizing plate provided in an optical path between the half mirror and the dark field pattern.

6. The position detecting device according to claim 1, further comprising a polarizing mirror provided between the dark field pattern and the liquid and configured to reflect and deflect the light flux reflected by the free surface of the liquid.

7. The position detecting device according to claim 1,
   wherein the light-receiving sensor includes a plurality of light-receiving elements, a vertical resister and a horizontal resister, and
   wherein the arithmetic unit is configured to subsequently store results of the detection of the patterns of the light flux of the respective light-receiving elements outputted from the respective light-receiving elements through the vertical resister and the horizontal resister, add the stored results of the detection of the respective light-receiving elements in the X-direction and the Y-direction of the light-receiving sensor, and calculate the positions of the patterns from an output obtained by adding the results of the detection of the stored results of the detection of the respective light-receiving element in the X-direction and the Y-direction.

8. The position detecting device according to claim 1,
   wherein the light-receiving sensor includes light-receiving elements arranged in a matrix-like configuration in the X-direction and the Y-direction,
   wherein the light-receiving sensor is configured to add signals from the light-receiving elements aligned in the X-direction and the Y-direction and output the added signals, and
   wherein the arithmetic unit is configured to calculate the positions of the patterns from the added signals added in the in the X-direction and the Y-direction and outputted.

9. The position detecting device according to claim 1, wherein the arithmetic unit is configured to convert the positions of the patterns to an angle of inclination based on the calculated positions of the patterns.

10. A position detecting device, comprising:
    an optical system including a light source configured to emit a light flux irradiated by the light source in parallel;
    a dark field pattern including transit portions through which the light flux from the light source is passed, wherein the transit portions are aligned two-dimensionally in an X-direction and a Y-direction;
    a liquid having a free surface configured to reflect the light flux as a pattern forming light flux which has passed through the transit portions of the dark field pattern;
    a half mirror provided between the liquid and the dark field pattern and configured to reflect the pattern forming light flux reflected by the free surface of the liquid;
    a projector lens configured to project the pattern forming light flux reflected by the half mirror as a projection image;
    a light-receiving sensor configured to receive the projection image projected by the projector lens and including light-receiving elements aligned in a matrix configuration in the X-direction and the Y-direction; and
    an arithmetic unit configured to calculate a position of the projection image projected on the light-receiving sensor based on reading outputs of the projection image outputted from the light-receiving sensor, add results of detection of the light-receiving elements aligned in the X-direction in the X-direction and output a reading output of the Y-direction, and add results of detection of the light-receiving elements aligned in the Y-direction in the Y-direction and output a reading output of the X-direction.

11. The position detecting device according to claim 10,
    wherein the light-receiving sensor further includes a vertical resister and a horizontal resister, and
    wherein the arithmetic unit is configured to subsequently store the results of the detection of the respective light-receiving elements outputted from the respective light-receiving elements through the vertical resister and the horizontal resister, add the stored results of the detection of the respective light-receiving elements in the X-direction and the Y-direction of the light-receiving sensor, and calculate the position of the projection image from the reading outputs obtained by adding the results of the detection of the stored results of the detection of the respective light-receiving element in the X-direction and the Y-direction.

12. The position detecting device according to claim 10,
wherein the transit portions are so disposed that widths thereof become different in the X-direction and the Y-direction, and
wherein the arithmetic unit is configured to calculate the position of the projection image relative to a reference position from the output obtained by adding the results of the detection in the X-direction and the Y-direction.

13. The position detecting device according to claim 10,
wherein the transit portions are so disposed that widths thereof become different periodically in the X-direction and the Y-direction, and
wherein the arithmetic unit is configured to perform a Fourier transformation of the output obtained by adding the results of the detection in the X-direction and the Y-direction, and calculate the position of the projection image relative to a reference position by utilizing a phase difference.

14. The position detecting device according to the claim 13, wherein the transit portions have the widths periodically different from each other in the X-direction and the Y-direction and disposed alternately.

15. The position detecting device according to claim 10, further comprising:
a half mirror configured to reflect and deflect the light flux reflected by the free surface of the liquid;
a quarter wavelength plate provided in an optical path between the liquid and the half mirror; and
a polarizing plate provided in an optical path between the half mirror and the dark field pattern.

16. The position detecting device according to claim 10, further comprising a polarizing mirror provided between the dark field pattern and the liquid and configured to reflect and deflect the light flux reflected by the free surface of the liquid.

17. The position detecting device according to claim 10, wherein the arithmetic unit is configured to convert the position of the projection image to an angle of inclination based on the calculated position of the projection image.

18. A position detecting device, comprising:
a liquid having a free surface;
a light source configured to irradiate a light flux toward the free surface of the liquid;
a dark field pattern provided between the liquid and the light source and configured to form at least one pattern of the light flux irradiated by the light source;
a light-receiving sensor configured to detect the at least one pattern of the light flux reflected by the free surface of the liquid;
a half mirror configured to reflect and deflect the light flux reflected by the free surface of the liquid;
a quarter wavelength plate provided in an optical path between the liquid and the half mirror;
a polarizing plate provided in an optical path between the half mirror and the dark field pattern; and
an arithmetic unit configured to calculate at least one position of the at least one pattern from results of detection of the light-receiving sensor, add the results of the detection of the light-receiving sensor in an X-direction and a Y-direction of the light-receiving sensor, and calculate the at least one position of the at least one pattern from an output obtained by adding the results of the detection in the X-direction and the Y-direction.

19. An inclination sensor device of a surveying apparatus, comprising a position detecting device according to claim 1.

20. An inclination sensor device of a surveying apparatus, comprising the position detecting device according to claim 10.

21. An inclination sensor device of a surveying apparatus, comprising the position detecting device according to claim 18.

* * * * *